United States Patent
Matsumoto et al.

(10) Patent No.: US 7,660,885 B2
(45) Date of Patent: Feb. 9, 2010

(54) COMMUNICATION PERFORMANCE ANALYZING PROGRAM, COMMUNICATION PERFORMANCE ANALYZING APPARATUS AND COMMUNICATION PERFORMANCE ANALYZING METHOD

(75) Inventors: Kazuhiro Matsumoto, Kawasaki (JP); Kouichi Kumon, Kawasaki (JP); Miyuki Ono, Kawasaki (JP); Shuji Yamamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 265 days.

(21) Appl. No.: 11/648,660

(22) Filed: Jan. 3, 2007

(65) Prior Publication Data
US 2007/0271373 A1 Nov. 22, 2007

(30) Foreign Application Priority Data
May 22, 2006 (JP) .............................. 2006-141053

(51) Int. Cl.
*G06F 15/173* (2006.01)
(52) U.S. Cl. .................. 709/223; 709/224; 709/225
(58) Field of Classification Search ......... 709/223–225, 709/203
See application file for complete search history.

(56) References Cited

U.S. PATENT DOCUMENTS 6,578,077 B1* 6/2003 Rakoshitz et al. ........... 709/224
2003/0055892 A1* 3/2003 Huitema et al. ............. 709/204
2003/0128692 A1* 7/2003 Mitsumori et al. .......... 370/352
2004/0059544 A1* 3/2004 Smocha et al. ............. 702/182
2007/0195700 A1* 8/2007 Katoh et al. ................ 370/235
2007/0204034 A1* 8/2007 Rexroad et al. ............. 709/224

FOREIGN PATENT DOCUMENTS

JP 2004-318739 11/2004

* cited by examiner

*Primary Examiner*—Hussein Elchanti
(74) *Attorney, Agent, or Firm*—Staas & Halsey LLP

(57) ABSTRACT

A communication performance analyzing program, a communication performance analyzing apparatus and a communication performance analyzing method make it possible to highly reliably grasp the communication performance of a computer system by automatically analyzing the communication performance. The communication performance analyzing program that causes a computer to analyze a data tendency of communication performance of a plurality of execution periods of a computer system formed by connecting a plurality of computers by a network, the program comprises a communication time acquisition step S2 that acquires communication time data among the computers of the computer system and a statistical analysis step S3 that analyzes the tendency of communication performance data of each execution period of the computer system, using the communication time among the computers, by statistically analyzing the communication time data acquired by the communication time acquisition step.

14 Claims, 19 Drawing Sheets

FIG. 1

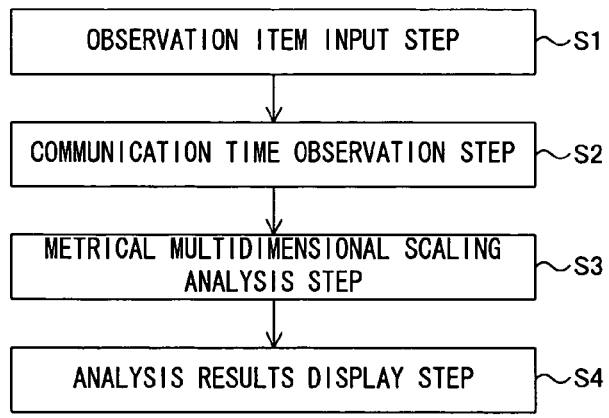

OBSERVATION ITEM INPUT STEP — S1

COMMUNICATION TIME OBSERVATION STEP — S2

METRICAL MULTIDIMENSIONAL SCALING ANALYSIS STEP — S3

ANALYSIS RESULTS DISPLAY STEP — S4

FIG. 2

| COMMUNICATION TIME | COMPUTER1 | COMPUTER2 | COMPUTER3 | COMPUTER4 |
|---|---|---|---|---|
| COMPUTER1 | — | 20 SECONDS | 19 SECONDS | 51 SECONDS |
| COMPUTER2 | 20 SECONDS | — | 18 SECONDS | 53 SECONDS |
| COMPUTER3 | 19 SECONDS | 18 SECONDS | — | 52 SECONDS |
| COMPUTER4 | 51 SECONDS | 53 SECONDS | 52 SECONDS | — |

FIG. 3

| COMPUTER | HORIZONTAL AXIS | VERTICAL AXIS |
|---|---|---|
| COMPUTER1 | 0.5 | 0.7 |
| COMPUTER2 | 0.7 | 2.0 |
| COMPUTER3 | 1.1 | 3.1 |
| COMPUTER4 | 4.0 | 0.5 |

| COMPUTER I | COMPUTER J | 1-by-1-1B | 1-by-1-1KB | Simultaneous-1B | Simultaneous-1KB |
|---|---|---|---|---|---|
| 1 | 2 | 2 SECONDS | 2800 SECONDS | 3 SECONDS | 3300 SECONDS |
| 1 | 3 | 3 SECONDS | 3100 SECONDS | 2 SECONDS | 2700 SECONDS |
| 1 | 4 | 2 SECONDS | 2900 SECONDS | 3 SECONDS | 2800 SECONDS |
| 2 | 3 | 2 SECONDS | 2900 SECONDS | 3 SECONDS | 3200 SECONDS |
| 2 | 4 | 3 SECONDS | 2700 SECONDS | 2 SECONDS | 2900 SECONDS |
| 3 | 4 | 3 SECONDS | 3200 SECONDS | 2 SECONDS | 3100 SECONDS |

| COMPUTER I | COMPUTER J | COMPUTER GROUP |
|---|---|---|
| 1 | 2 | A |
| 1 | 3 | A |
| 1 | 4 | B |
| 2 | 3 | A |
| 2 | 4 | B |
| 3 | 4 | B |

| COMPUTER I | COMPUTER J | 1ST MAIN COMPONENT | 2ND MAIN COMPONENT | 3RD MAIN COMPONENT |
|---|---|---|---|---|
| 1 | 2 | 0.5 | 0.6 | 0.2 |
| 1 | 3 | 0.7 | 0.8 | 0.4 |
| 2 | 3 | 0.3 | 0.1 | 0.9 |

FIG. 19
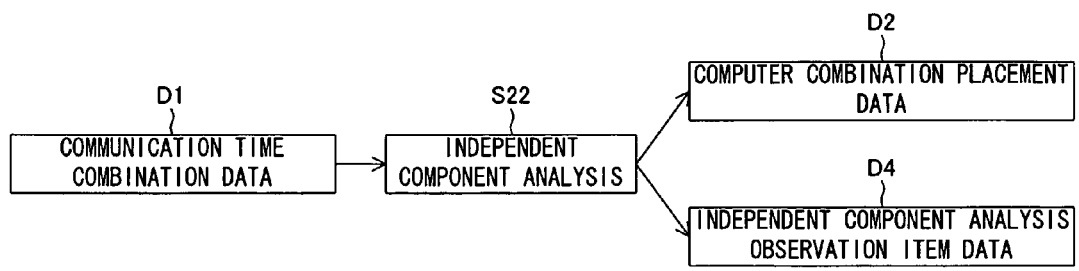
FIG. 20
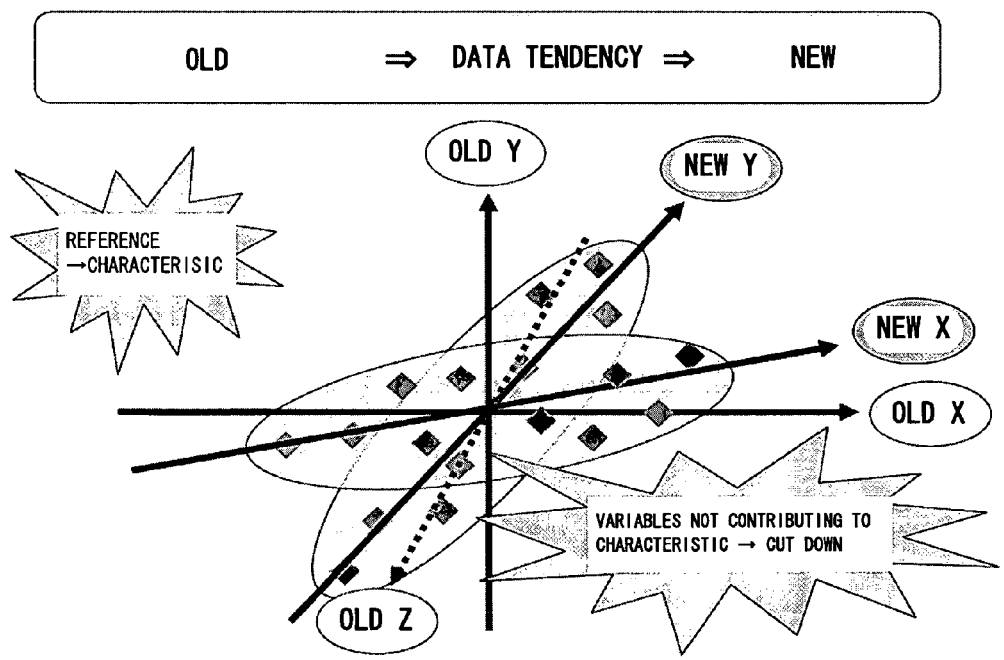
FIG. 21
| COMPUTER I | COMPUTER J | 1ST INDEPENDENT COMPONENT | 2ND INDEPENDENT COMPONENT | 3RD INDEPENDENT COMPONENT |
|---|---|---|---|---|
| 1 | 2 | 0.5 | 0.6 | 0.2 |
| 1 | 3 | 0.7 | 0.8 | 0.4 |
| 2 | 3 | 0.3 | 0.1 | 0.9 |

|  | 1ST MAIN COMPONENT | 2ND MAIN COMPONENT |
|---|---|---|
| 1-by-1-1B | 0.5 | 0.6 |
| 1-by-1-1KB | -0.5 | 0.4 |
| Simultaneous-1B | 0.4 | 0.7 |
| Simultaneous-1KB | -0.6 | 0.7 |

| | 1ST INDEPENDENT COMPONENT | 2ND INDEPENDENT COMPONENT |
|---|---|---|
| 1-by-1-1B | 0.5 | 0.6 |
| 1-by-1-1KB | -0.5 | 0.4 |
| Simultaneous-1B | 0.4 | 0.7 |
| Simultaneous-1KB | -0.6 | 0.7 |

FIG. 30

| COMPUTER I | COMPUTER J | COMPUTER GROUP |
|---|---|---|
| 1 | 2 | A |
| 1 | 3 | A |
| 1 | 4 | B |
| 2 | 3 | A |
| 2 | 4 | B |
| 3 | 4 | B |

FIG. 31

|  | COMPUTER 1 | COMPUTER 2 | COMPUTER 3 | COMPUTER 4 |
|---|---|---|---|---|
| COMPUTER 1 |  | A | A | B |
| COMPUTER 2 | A |  | A | B |
| COMPUTER 3 | A | A |  | B |
| COMPUTER 4 | B | B | B |  |

| COMPUTER I | COMPUTER J | COMPUTER GROUP |
|---|---|---|
| 1 | 2 | A |
| 1 | 3 | A |
| 1 | 4 | A |
| 2 | 3 | A |
| 2 | 4 | B |
| 3 | 4 | B |

| COMPUTER | SCORE |
|---|---|
| 1 | 3/4 |
| 2 | 1 |
| 3 | 1 |
| 4 | 5/4 |

FIG. 39
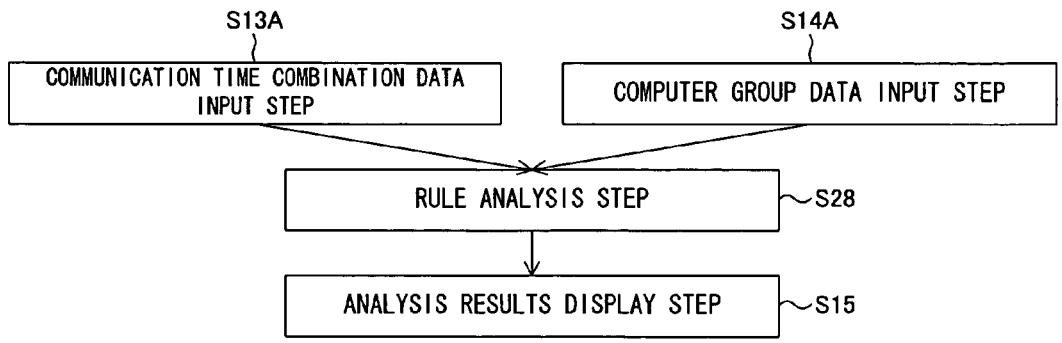
FIG. 40
| RULE 1 | "COMPUTER GROUP A" IF "COMMUNICATION TIME OF 1-by-1-1B < 1 SECOND" |
| --- | --- |
| RULE 2 | "COMPUTER GROUP A" IF "COMMUNICATION TIME OF Simultaneous-1KB < 1,000 SECONDS" |
| RULE 3 | "COMPUTER GROUP B" IF "RULE 1 AND RULE 2 ARE NOT APPLICABLE" |
FIG. 41
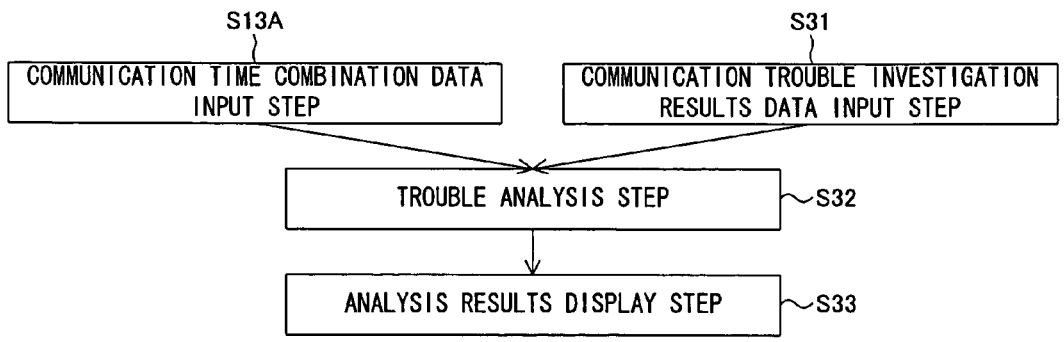

| COMPUTER I | COMPUTER J | COMPUTER TROUBLE INVESTIGATION RESULTS |
|---|---|---|
| 1 | 2 | NORMAL |
| 1 | 3 | NORMAL |
| 1 | 4 | IN TROUBLE |
| 2 | 3 | NORMAL |
| 2 | 4 | IN TROUBLE |
| 3 | 4 | IN TROUBLE |

| RULE 1 | "ABNORMAL" IF "COMMUNICATION TIME OF 1-by-1-1B > 10 SECONDS" AND "COMMUNICATION TIME OF Simultaneous-1KB > 1,000 SECONDS" |
|---|---|
| RULE 2 | "NORMAL" IF "RULE 1 IS NOT APPLICABLE" |

COMMUNICATION PERFORMANCE ANALYZING PROGRAM, COMMUNICATION PERFORMANCE ANALYZING APPARATUS AND COMMUNICATION PERFORMANCE ANALYZING METHOD

BACKGROUND OF THE INVENTION

1. Field of the Invention

This invention relates to a computer readable medium having computer executable instruction for performing a communication performance analyzing, a communication performance analyzing apparatus and a communication performance analyzing method for analyzing the trend of data on the communication performance of a plurality of computers of a computation system in each execution period, the computation system being formed by connecting a plurality of computers by way of a network.

2. Description of the Related Art

The technique of raising the processing speed of scientific and technological computations by means of a computer system realized by connecting and parallelizing a large number of computers by way of a high speed network is known.

For such a computation system, it is necessary to verify that the computation system is configured properly and shows a satisfactory data transfer performance on the system level prior to verifying the efficiency of parallelization by means of real applications.

Conventionally, in such a verifying operation, the person who configured the system and/or a professional of verifying operations observes the communication time of each of the computers and visually checks the system to see that the average value and the maximum value of the communication times are not abnormal.

The expression of communication time data refers to data obtained by observing the communication time of each combination of computers held in a communication relationship. When N computers exist, the number of combinations of all the computers is $N \times (N-1)/2$. Thus, the communication time data of a system having N computers refers to the data obtained by observing the communication time of each of the $N \times (N-1)/2$ combinations of the N computers.

The communication time is observed after specifying the items of observation such as communication mode and communication data length. The communication mode is selected from a plurality of different modes such as a mode where the communication time of a combination of computers held in a communication relationship is observed after occupying the network and a mode where the network is shared even when making such an observation.

The communication data length is selected from a plurality of data lengths such as 2 B, 16 B and 128 B. The communication time is observed after specifying one of the communication modes, one of the communication data lengths and so on. For example, if there are N1 different communication modes and N2 different communication data lengths, it is possible to observe $N1 \times N2$ different sets of communication time data.

With the prior art, the average value and the maximum value are computationally determined for a set or a plurality of sets of communication time data and interpreted to verify the communication performance.

As a technique relating to the present invention, a technique invented for the purpose of providing new techniques of burying network data suited for browsing in a low dimensional space is known. This technique employs a process of computationally determining the improvement index for the position of burying each node toward an optimal placement, using the position of burying each of the nodes that are updated sequentially as object to be processed and an objective function that tends to approach to a value as each node approaches an optimal position on an assumption that a node directly connected to another node by a link is optimally placed when it is placed closer to the another node than a node not directly connected to the another node by a link, a process of determining if the operation of updating the position of burying each node is to be ended or not according to the improvement index and a process of updating the position of burying each node so as to make it approach an optimal placement, using the value led out from the objective function, when the operation of updating the position is not to be ended. With this arrangement, it is possible to realize a burying operation, truly conserving the connection relationships (see, for example, Patent Document 1: Jpn. Pat. Appln. Laid-Open Publication No. 2004-318739).

However, with the above-described prior art, visual performance verification of communication time data is accompanied by the following problems.

1) It is difficult to intuitively understand communication time data. For example, it is difficult to intuitively notice a computer that can highly possibly fall into trouble.
2) It is difficult to intuitively understand the overall tendency of communication time data when the number of computer is large. It is difficult to intuitively grasp if all the computers show a communication performance of a substantially same level or the communication performance of the computers show dispersions.
3) It is difficult to intuitively understand the relationship between the communication performance and the observation items when there are a number of observation items for the communication mode and/or the communication data length. For example, it is difficult to intuitively grasp if the communication performance is influenced significantly by the communication mode, by the communication data length and/or by the combination of a specific communication mode and a specific communication data length.
4) It is difficult to intuitively understand the relationship between each of a plurality of observation items and a combination of a large number of computers. For example, it is difficult to intuitively find out that there is a computer that performs poorly when the communication data length is short and/or that there is a computer that performs poorly in a specific communication mode.
5) It is difficult to intuitively comprehend the tendency of the communication time data of each computer on the basis of the communication time data for a combination of computers. For example, it is difficult to intuitively find out if the communication performances of all the computers are substantially at the same level or the communication performance of a specific computer is poor.
6) It is difficult to give priority to each of the computers when checking the computers for trouble. For example, it is difficult to give a score to each computer by computations in terms of the degree of normality or abnormality.
7) It is difficult to intuitively comprehend the relation of cause and effect between the observed values on communication time and the communication performance. For example, it is difficult to intuitively comprehend the relation of cause and effect for a normal communication performance or an abnormally poor communication performance of a computer when the communication performance of a specific observation item is found within a specific range.
8) It is difficult to intuitively understand the conditions of an observed value of communication time that characterizes a computer trouble. For example, when the communication performance of a specific observation item is found within a specific range, it is difficult to objectively and automatically grasp the conditions relating to the level of possibility of a computer trouble.

9) It is difficult to automatically and objectively detect a computer trouble or a fall in the communication performance of a computer when the computer system is in operation.

SUMMARY OF THE INVENTION

In view of the above-identified problems, it is therefore an object of the present invention to provide a communication performance analyzing program, a communication performance analyzing apparatus and a communication performance analyzing method with which it is possible to highly reliably grasp the communication performance of a computer system by automatically analyzing the communication performance.

In an aspect of the present invention, the above object is achieved by providing a computer readable recording medium as communication performance analyzing program that causes a computer to analyze a data tendency of communication performance of a plurality of execution periods of a computer system formed by connecting a plurality of computers by a network, the program including: a communication time acquisition step that acquires communication time data among the computers of the computer system; and a statistical analysis step that analyzes the tendency of communication performance data of each execution period of the computer system, using the communication time among the computers, by statistically analyzing the communication time data acquired by the communication time acquisition step.

In a communication performance analyzing program, preferably the statistical analysis step conducts an analysis, using metrical multidimensional scaling. Alternatively, the statistical analysis step may conduct an analysis, using non-metrical multidimensional scaling. Still alternatively, the statistical analysis step may conduct an analysis, using the sammon mapping algorithm.

In a communication performance analyzing program according to the present invention, preferably the communication time acquisition step acquires communication time data among the computers of the computer system on a plurality of observation items and includes a communication time combining step that permutes the communication time data on the plurality of observation items acquired by the communication time acquisition step to prepare communication time combination data, and the statistical analysis step includes a clustering analysis step that conducts a statistical analysis by clustering, using the communication time combination data prepared by the communication time combining step, and a grouping operation for combinations of computers or observation items.

Preferably, a communication performance analyzing program according to the present invention further comprises a principal component analysis step that conducts a statistical analysis on the communication time data by way of principal component analysis, using the communication time combination data prepared by the communication time combining step, and the clustering analysis step groups the results of the statistical analysis conducted by the principal component analysis step and displays a scatter diagram based on predetermined principal components.

Preferably, a communication performance analyzing program according to the present invention further comprises an independent component analysis step that conducts a statistical analysis by way of independent component analysis, using the communication time combination data prepared by the communication time combining step, and the clustering analysis step groups the results of the statistical analysis conducted by the independent component analysis step and displays a scatter diagram based on predetermined independent components.

Preferably, in a communication performance analyzing program according to the present invention, the principal component analysis step conducts an analysis on the similarity of the plurality of observation items, using the communication time combination data prepared by the communication time combining step, and generates principal component analysis/observation item data and the clustering analysis step conducts a grouping operation for the similarity of the observation items, using the principal component analysis/observation item data generated by the principal component analysis step.

Preferably, in a communication performance analyzing program according to the present invention, the independent component analysis step conducts an analysis on the similarity of the plurality of observation items, using the communication time combination data prepared by the communication time combining step, and generates independent component analysis/observation item data and the clustering analysis step conducts a grouping operation for the similarity of the observation items, using the independent component analysis/observation item data generated by the independent component analysis step.

Preferably, in a communication performance analyzing program according to the present invention, the clustering analysis step includes a group display step that groups the plurality of computers on the basis of the similarity of communication time, sets each of the computers on the vertical axis and the horizontal axis for each group of computers formed on the similarity of communication time obtained by the clustering analysis step and displays the results of the grouping conducted by the clustering analysis step.

Preferably, a communication performance analyzing program according to the present invention further comprises a computer grouping step that groups the plurality of computers according to the communication time combination data acquired by the communication time combining step, an observation item grouping step that groups the plurality of observation items according to the communication time combining data acquired by the communication time combining step and a display step that displays the computer groups obtained by the computer grouping step in association with the observation item groups obtained by the observation item grouping step.

Preferably, a communication performance analyzing program according to the present invention further comprises a scoring analysis step that computes scores on the degree of normality or abnormality of the communication performance of each computer on the basis of the results of grouping the computers by the clustering analysis step.

Preferably, in a communication performance analyzing program according to the present invention, the display step conducts a parallel coordinate plot of displaying the communication times between two computers on a plurality of polygonal lines by indicating the observation items on each of a plurality of axes and indicating computer groups on an axis.

Preferably, in a communication performance analyzing program according to the present invention, the clustering analysis step includes a decision tree analysis step that indicates the relationship between the plurality of observation item groups and the plurality of computer groups by means of an algorithm of a decision tree and displays the computer groups as conclusion part on the condition of the range of each of the item groups.

In another aspect of the present invention, there is provided a communication performance analyzing apparatus that analyzes a data tendency of communication performance of a plurality of execution periods of a computer system formed by connecting a plurality of computers by a network, the program including: a communication time acquisition section that acquires communication time data among the computers of the computer system; and a statistical analysis section that analyzes the tendency of communication performance data of each execution period of the computer system, using the communication time among the computers, by statistically analyzing the communication time data acquired by the communication time acquisition section.

In still another aspect of the present invention, there is provided a communication performance analyzing method that causes a computer to analyze a data tendency of communication performance of a plurality of execution periods of a computer system formed by connecting a plurality of computers by a network, the program including: a communication time acquisition step that acquires communication time data among the computers of the computer system; and a statistical analysis step that analyzes the tendency of communication performance data of each execution period of the computer system, using the communication time among the computers, by statistically analyzing the communication time data acquired by the communication time acquisition step.

Thus, the present invention provides the advantage of automatically analyzing the communication performance of a computer system with a high degree of reliability and allowing to easily understand the communication performance.

BRIEF DESCRIPTION OF THE DRAWINGS

FIG. 1 is a flowchart of the operation of Embodiment 1 of the present invention;

FIG. 2 is a schematic illustration of communication time data, shown as an example;

FIG. 3 is a schematic illustration of computer placement data, shown as an example;

FIG. 19 is a schematic illustration of the operation of independent component analysis;

FIG. 20 is a schematic conceptual illustration of independent component analysis;

FIG. 21 is a schematic illustration of independent component analysis data, shown as an example;

FIG. 30 is a schematic illustration of computer group data, shown as an example;

FIG. 31 is a schematic illustration of the display image of computer groups, shown as an example;

FIG. 39 is a flowchart of the operation of Embodiment 13 of the present invention;

FIG. 40 is a schematic illustration of the display image of the result of rule analysis;

FIG. 41 is a flowchart of the operation of Embodiment 14 of the present invention;

DETAILED DESCRIPTION OF THE PREFERED EMBODIMENTS

Figure 4:
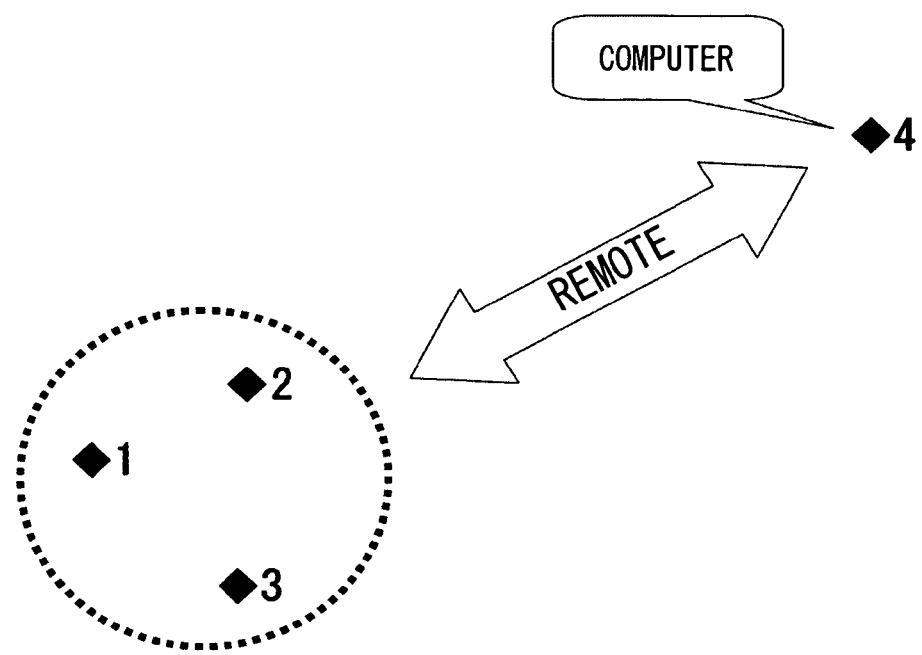
FIG. 4 is a schematic illustration of the display image of the results of analysis by means of metrical multidimensional scaling, shown as an example.

Now, embodiments of the present invention will be described in greater detail by referring to the accompanying drawings. Possible embodiments of the invention include SMP systems containing a large number of CPUs, SMP clusters formed by connecting SMP systems by a network and computer systems connected to a wide area network such as a WAN or a grid.

Embodiment 1

Embodiment 1 is a computer system formed by connecting a plurality of computers by a network and adapted to present the communication performance of the computer system to the users in an easily understandable way by observing inter-computer communication times, statistically analyzing the communication time data obtained by observations by means of metrical multidimensional scaling and placing the computers by assuming the inter-computer communication times to be inter-computer distances. Thus, metric multidimensional scaling is used for statistical analysis.

FIG. 1 is a flowchart of the overall operation of Embodiment 1 of the present invention. Referring to FIG. 1, Embodiment 1 has an observation item input step (observation item input section) S1 that inputs an observation item relating to communication time, a communication time observation step (communication time observation section) S2 that observes the communication time for the observation item input by the observation item input step S1, a metrical multidimensional scaling analysis step (metrical multidimensional scaling analysis section) S3 that analyzes the communication time data observed and acquired by the communication time observation step S2 and an analysis results display step (analysis results display section) S4 that is an analysis results output section that outputs the results of the analysis conducted by the metrical multidimensional scaling analysis step S3.

Note that the communication time observation step S2 corresponds to the communication time acquisition step or the communication time acquisition section in the claims.

The observation item in the observation item input step S1 may be a communication mode or a communication data length. The communication mode may be selected from the modes listed below.
1) 1-by-1 mode ... When observing the communication time of computer I and computer J, the computers are allowed to occupy the network to observe the communication time, eliminating any other communications.
2) Simultaneous mode ... When observing the communication time of computer I and computer J, communications other than the communication of the computer I and the computer J are allowed to share the network while observing the communication time.

The communication data length may be 2 B (bytes), 16 B, 128 B, 1 KB or some other bytes. The observed communication time is handled as data and observation data is obtained for an observation item. FIG. 2 is a schematic illustration of communication time data shown as an example.

The metrical multidimensional scaling analysis step S3 analyzes the communication time data obtained as a result of the observation by means of the known algorithm of metrical multidimensional scaling and determines the placement of each computer of the computer system that comprises a plurality of computers, assuming the communication time of the computer I and the computer J obtained as a result of the metrical multidimensional scaling analysis to be the distance of the computer I and the computer J. The analysis results display step S4 displays the results of the analysis conducted by the metrical multidimensional scaling analysis step S3. FIG. 3 is a schematic illustration of computer placement data, shown as an example.

FIG. 4 is a schematic illustration of the display image of the results of analysis by means of metrical multidimensional scaling, shown as an example. Referring to FIG. 4, the points (1 through 4) indicate the placed respective computers. In FIG. 4, the computer 4 is placed at a position remote from the computers 1 through 3 to indicate that the communication time of the computer 4 and any of the computers 1 through 3 is long. Thus, FIG. 4 indicates that the probability of computer trouble is high for the computer 4 if compared with the other computers 1 through 3 from the viewpoint of communication performance.

Embodiment 2

Figure 5:
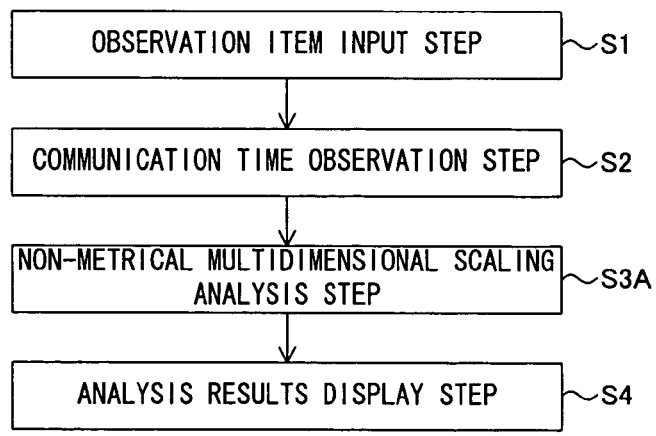
FIG. 5 is a flowchart of the operation of Embodiment 2 of the present invention.

FIG. 5 is a flowchart of the overall operation of Embodiment 2 of the present invention. Embodiment is realized by replacing the metrical multidimensional scaling analysis step S3 of FIG. 1 with a non-metrical multidimensional scaling analysis step S3A. Otherwise, Embodiment 2 is identical with Embodiment 1 in terms of configuration and hence will not be described any further except the replacement step.

The non-metrical multidimensional scaling analysis step S3A analyzes the communication time data obtained as a result of the observation by the communication time observation step S2 by means of the known algorithm of non-metrical multidimensional scaling and determines the placement of each computer of the computer system that comprises a plurality of computers, assuming the communication time of the computer I and the computer J obtained as a result of the non-metrical multidimensional scaling analysis to be the distance of the computer I and the computer J.

Figure 6:
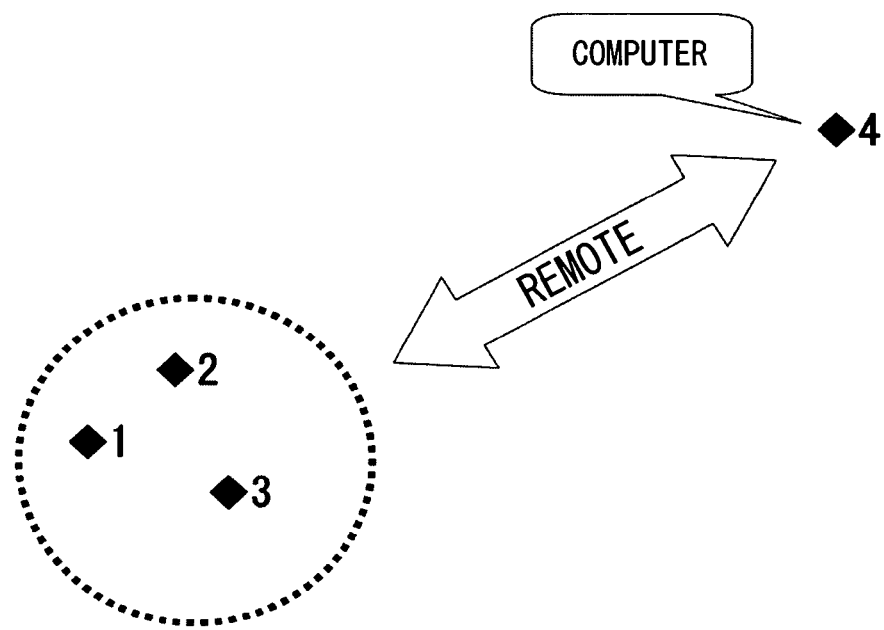
FIG. 6 is a schematic illustration of the display image of the results of analysis by means of non-metrical multidimensional scaling, shown as an example.

FIG. 6 is a schematic illustration of the display image of the results of analysis by means of non-metrical multidimensional scaling, shown as an example. Referring to FIG. 6, the points (1 through 4) indicate the placed respective computers. In FIG. 6, the computer 4 is placed at a position remote from the computers 1 through 3 to indicate that the communication time of the computer 4 and any of the computers 1 through 3 is long. Thus, FIG. 6 indicates that the probability of computer trouble is high for the computer 4 if compared with the other computers 1 through 3 from the viewpoint of communication performance.

Embodiment 3

Figure 7:
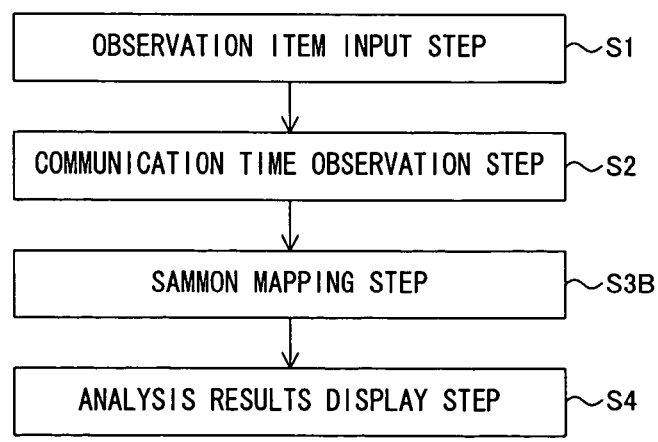
FIG. 7 is a flowchart of the operation of Embodiment 3 of the present invention.

FIG. 7 is a flowchart of the overall operation of Embodiment 3 of the present invention. Embodiment 3 is realized by replacing the metrical multidimensional scaling analysis step S3 of FIG. 1 with a sammon mapping step S3B that conducts an analysis by means of the algorithm of sammon mapping. Otherwise, Embodiment 3 is identical with Embodiment 1 in terms of configuration and hence will not be described any further except the replacement step.

The sammon mapping step S3B analyzes the communication time data obtained as a result of the observation by the communication time observation step S2 by means of the known sammon mapping algorithm and determines the placement of each computer of the computer system that comprises a plurality of computers, assuming the communication time of the computer I and the computer J obtained as a result of the sammon mapping analysis to be the distance of the computer I and the computer J.

Figure 8:
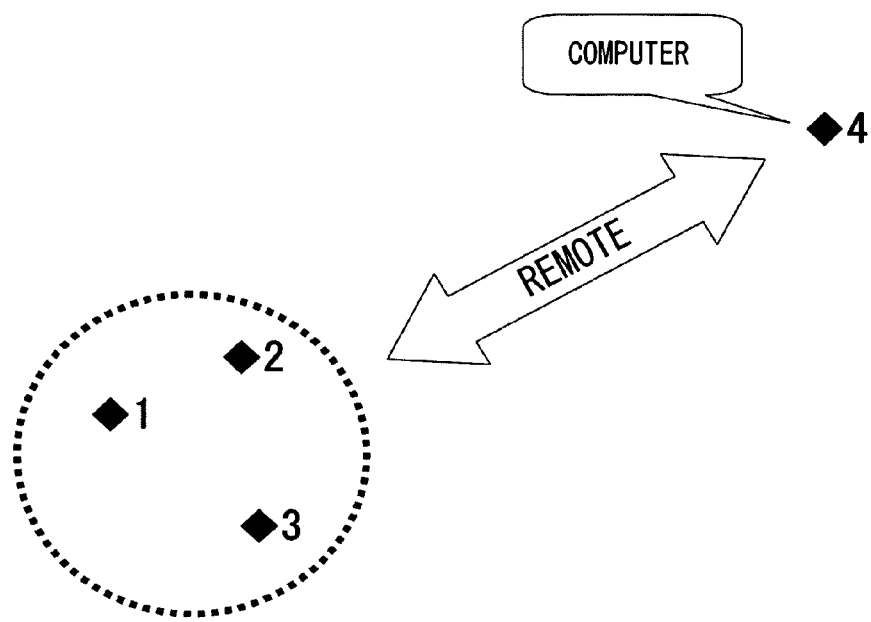
FIG. 8 is a schematic illustration of the display image of the results of analysis by means of a sammon mapping, shown as an example.

FIG. 8 is a schematic illustration of the display image of the results of analysis by means of a sammon mapping, shown as an example. Referring to FIG. 8, the points (1 through 4) indicate the placed respective computers. In FIG. 8, the computer 4 is placed at a position remote from the computers 1 through 3 to indicate that the communication time of the computer 4 and any of the computers 1 through 3 is long. Thus, FIG. 8 indicates that the probability of computer trouble is high for the computer 4 if compared with the other computers 1 through 3 from the viewpoint of communication performance.

The metrical multidimensional scaling analysis step, the non-metrical multidimensional scaling analysis step and the sammon mapping step of Embodiments 1 through 3 use communication time data for statistical analysis and output computer placement data.

Generally, it is not possible to place computers to accurately reflect communication times when the number of computers is large and the number of axes to be used for displaying is small. In other words, a process that searches for placement of computers that approximately reflect communication times is required. Since the above-described metrical multidimensional scaling analysis step, the non-metrical multidimensional scaling analysis step and the sammon mapping step use different respective approximation techniques, they output different computer placement data for the same communication time data.

In reality, they preferably conduct analyses respectively by means of metrical multidimensional scaling, non-metrical multidimensional scaling and a sammon mapping so that their approximations may be compared and evaluated and the ultimate computer placement data may reliably be selected.

Embodiment 4

Embodiment 4 is adapted to rearrange the communication time data obtained for a plurality of observation items by observations, prepare communication time combination data, conduct statistical analysis on the communication time combination data by clustering and display the tendency of communication time data in the form of a scatter diagram so that the user may easily grasp the overall tendency of communication performance.

Figure 9:
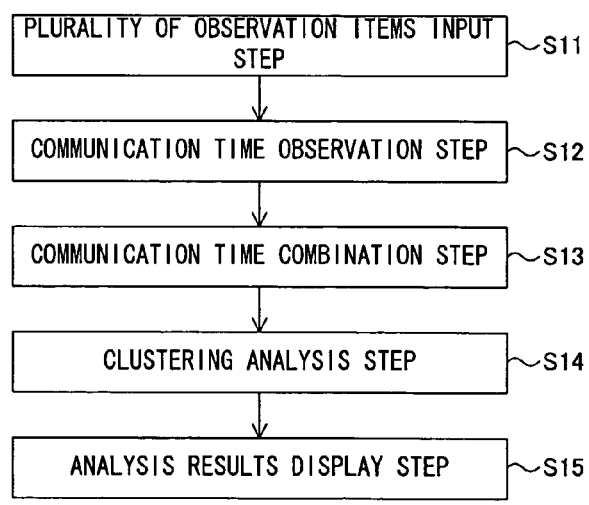
FIG. 9 is a flowchart of the operation of Embodiment 4 of the present invention.

FIG. 9 is a flowchart of the overall operation of Embodiment 4 of the present invention. Referring to FIG. 9, Embodiment 4 has an observation item input step S11 that inputs a plurality of observation items relating to communication time, a communication time observation step S12 that observes the communication time for the plurality of observation items input by the observation item input step S11, a communication time combining step S13 that rearranges and combines the communication time data observed and acquired by the communication time observation step S12 and outputs the obtained communication time combination data, a clustering analysis step S14 that conducts a statistical analysis, using the communication time combination data prepared by the communication time combining step S13 for the purpose of grouping computers showing the same tendency for communication time and an analysis results display step S15 that displays the results of analysis obtained by the clustering analysis step S14.

Figures 10, 11, 12:
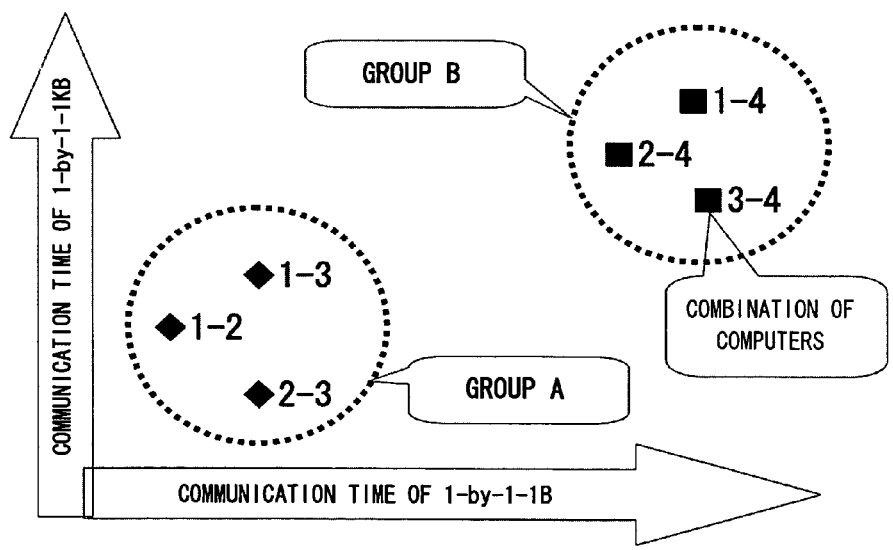
FIG. 10 is a schematic illustration of communication time combination data, shown as an example.
FIG. 11 is a schematic illustration of computer group data, shown as an example.
FIG. 12 is a schematic illustration of the display image of the results of analysis by means of clustering, shown as an example.

FIG. 10 is a schematic illustration of the communication time combination data obtained by the communication time combining step S13, shown as an example. Referring to FIG. 10, the observation items include the two modes described above for Embodiment 1, each of which is combined with a data length of 1 B and a data length of 1 KB.

The clustering analysis step S14 groups computers showing the same tendency for communication time by means of the known clustering algorithm.

For clustering, the communication time of computer I and computer J and the communication time of computer L and computer M are compared and the difference is computed. Then, the computers of the computer system are appropriately combined for grouping so that computers showing a small difference of computer time may be put into the same group and hence computers showing a large difference of computer time may be put into different groups.

When data are analyzed for communication performance, a large group of computers formed by combining most of the computers of the computer system and a small group of computers formed by combining a small number of computers may be formed. In such cases, the computers belonging to the large group performs well for communications while the computers belonging to the small group can fall into trouble more often than not.

FIG. 11 is a schematic illustration of the computer group data that can be obtained as a result of a grouping operation by the clustering analysis step S14, shown as an example. FIG. 12 is a schematic illustration of the image displayed by the analysis results display step S15, shown as an example. In FIG. 12, the two axes indicate communication times for two observation items that are different in terms of data length in the same mode. Each spot in FIG. 12 indicates a combination of computers for communication. Computers showing the same tendency in terms of communication time are indicated by spots of the same profile. Additionally, computers showing the same tendency may be indicated by spots of the same color in addition to the same profile.

While Embodiment 4 is described in terms of clustering analysis directly using communication time combination data, it is also possible for clustering analysis to use computer data obtained by a principal component analysis or an independent component analysis that is conducted by using communication time combination data as will be described in greater detail hereinafter.

Embodiment 5

Embodiment 5 is adapted to group the computers by clustering in terms of 25 communication time on the basis of the results of a statistical analysis of analyzing principal components for the communication time combination data prepared by the above-described communication time combining step and display a scatter diagram on the basis of a relatively small number of principal components. With this arrangement, it is possible for the user to easily grasp the overall tendency of communication performance if a large number of different types of observation items are involved.

Figure 13:
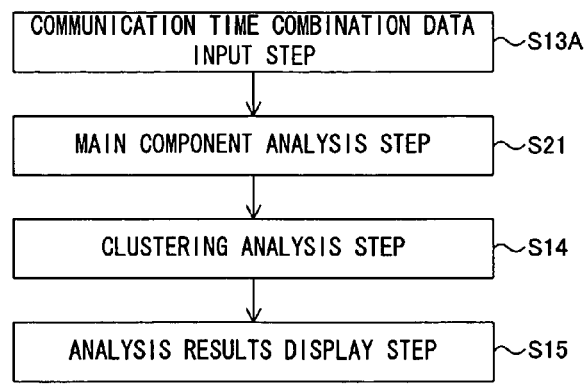
FIG. 13 is a flowchart of the operation of Embodiment 5 of the present invention.

FIG. 13 is a flowchart of the overall operation of Embodiment 5 of the present invention. Embodiment 5 comprises a communication time combination data input step S13A that inputs (acquires) the communication time combination data obtained by the communication time combining step S13 of Embodiment 4 and a principal component analysis step S21 that analyzes the principal components by means of the communication time combination data and is adapted to conduct a principal component analysis, using the communication time combination data input by the communication time combination data input step S13A to acquire principal component analysis computer data.

The clustering analysis step S14 groups the computers for the purpose of combining computers showing the same tendency for communication time, using the principal component analysis computer data prepared by the principal component analysis step S21 and the analysis results display step S15 outputs the results of analysis of the principal component analysis computer that are the result of the clustering analysis.

Figure 14:
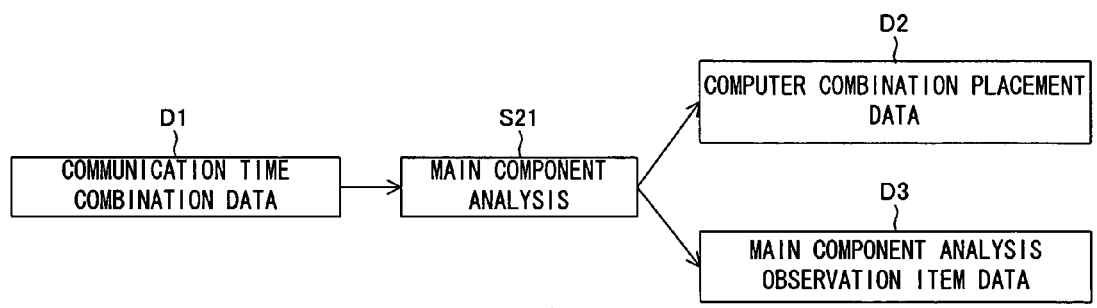
FIG. 14 is a schematic illustration of the operation of principal component analysis.

The principal component analysis by the principal component analysis step S21 is based on the well known principal component analysis algorithm, which hence will not be described here any further. As shown in FIG. 14, the principal component analysis uses the communication time combination data D1 as input and outputs computer combinations/placement data D2 and principal component analysis observation item data D3.

A principal component analysis is adapted to output computer combinations/placement data by means of multiplications of a matrix of communication time combination data. The matrix to be used for multiplications is selected so as to make the principal components agree with the direction of dispersions of data. The principal component analysis observation item data can be computationally determined from the matrix to be used for multiplications.

This embodiment is described here in terms of the use of computer combinations/placement data D2. The use of principal component analysis observation item data D3 will be described in greater detail hereinafter.

The number of observation items can include more than 10 different types when analyzing communication performances. In such a case, it will be difficult to visually interpret the obtained results. Then, as shown in FIG. 15, it is possible to facilitate interpretation of the results by using a principal component analysis and displaying data, using the principal components in place of the observation items and dispersions as reference for evaluation.

Figures 15, 16:
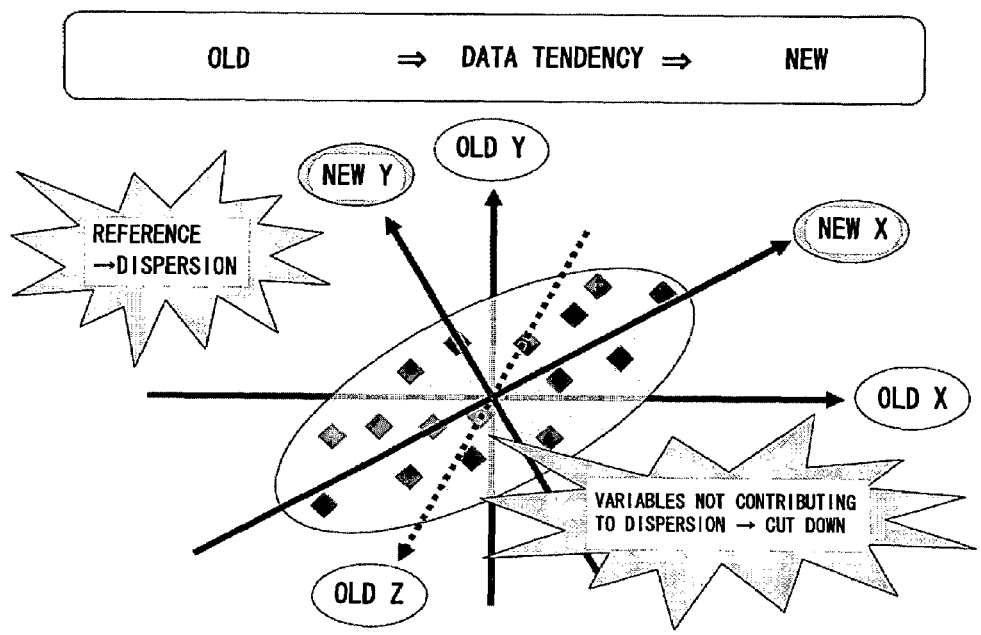
FIG. 15 is a schematic conceptual illustration of principal component analysis.
FIG. 16 is a schematic illustration of principal component analysis computer data, shown as an example.
Figure 17:
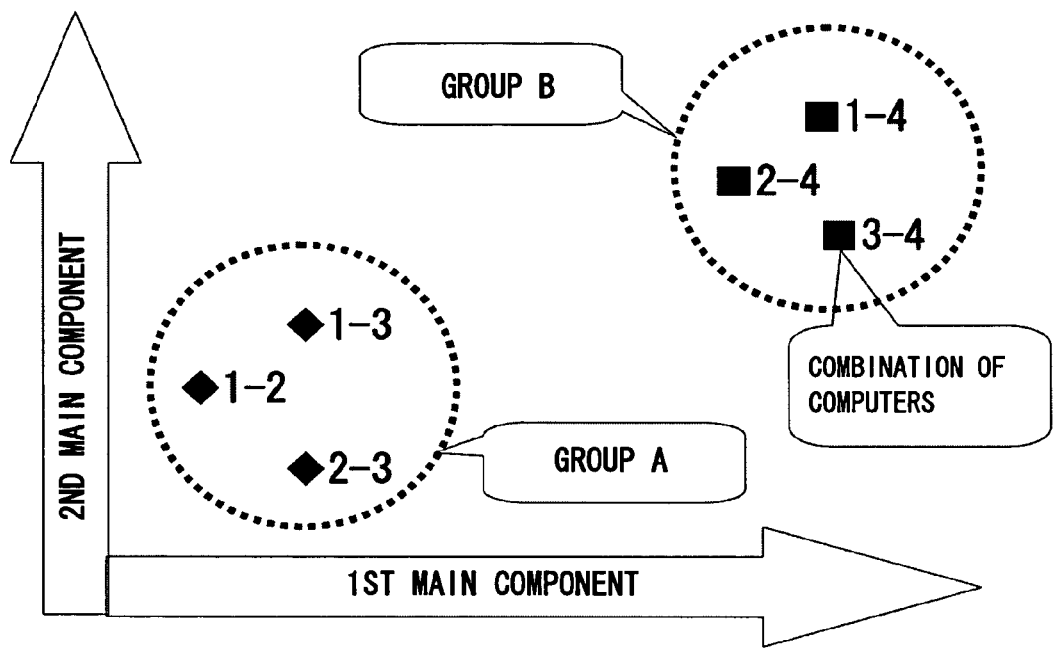
FIG. 17 is a schematic illustration of the display image of the results of analysis obtained by a principal component analysis.

FIG. 16 is a schematic illustration of principal component analysis computer data, shown as an example and FIG. 17 is a schematic illustration of the display image of the results of analysis by a principal component analysis computer. In FIG. 17, each coordinate axis indicates a principal component to be used for computations in the principal component analysis. Each spot in FIG. 17 indicates a combination of computers for communication. Computers showing the same tendency may be indicated by spots of the same profile and the same color as described above for Embodiment 4.

Embodiment 6

Embodiment 6 is adapted to group the computers by clustering in terms of communication time on the basis of the results of a statistical analysis of analyzing independent components for the communication time combination data prepared by the above-described communication time combining step and display a scatter diagram on the basis of a relatively small number of independent components. With this arrangement, it is possible for the user to easily grasp the overall tendency of communication performance if a large number of different types of observation items are involved.

Figure 18:
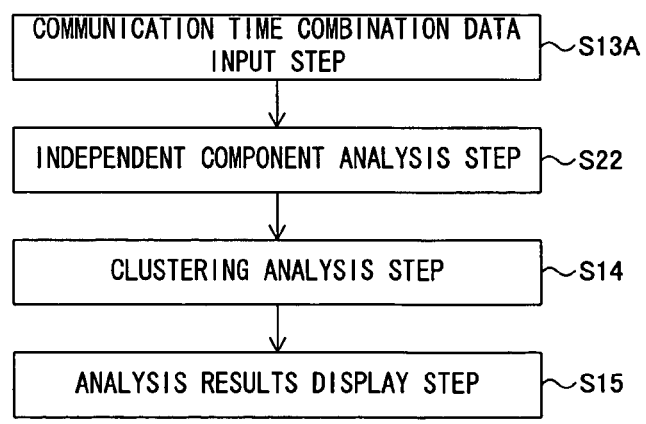
FIG. 18 is a flowchart of the operation of Embodiment 6 of the present invention.

FIG. 18 is a flowchart of the overall operation of Embodiment 6 of the present invention. Embodiment 6 comprises a communication time combination data input step S13A that inputs the communication time combination data obtained by the communication time combining step S13 of Embodiment 4 and an independent component analysis step S22 that analyzes the independent components by means of the communication time combination data and is adapted to conduct an independent component analysis, using the communication time combination data input by the communication time combination data input step S13A to acquire independent component analysis computer data.

The clustering analysis step S14 groups the computers for the purpose of combining computers showing the same tendency for communication time, using the independent component analysis computer data prepared by the independent component analysis step S22 and the analysis results display step S15 outputs the results of analysis of the independent component analysis computer that are the result of the clustering analysis.

The independent component analysis by the independent component analysis step S22 is based on the well-known independent component analysis algorithm, which hence will not be described here any further. As shown in FIG. 19, the independent component analysis uses the communication time combination data D1 as input and outputs computer combinations/placement data D2 and independent component analysis observation item data D4.

An independent component analysis is adapted to output computer combinations/placement data by means of multiplications of a matrix of communication time combination data. The matrix to be used for multiplications is selected so as to make the independent components agree with the direction of characteristics of data. The independent component analysis observation item data can be computationally determined from the matrix to be used for multiplications.

This embodiment is described here in terms of the use of computer combinations/placement data D2. The use of independent component analysis observation item data D4 will be described in greater detail hereinafter.

The number of observation items may include more than 10 different types when analyzing communication performances. In such a case, it will be difficult to visually interpret the obtained results. Then, it is possible to facilitate interpretation of the results by using an independent component analysis and displaying data, using the independent components in place of the observation items and characteristics as reference for evaluation.

If a principal component analysis that uses dispersions as reference for evaluation is appropriate or an independent component analysis that uses characteristics as reference for evaluation is appropriate depend on the data obtained as a result of observation. In many actual instances of utilization, either of them is selected by comprehensively interpreting and comparing the results of the principal component analysis and those of independent component analysis. The results of the principal component analysis and those of the independent component analysis may show the same tendency. If such is the case, it is safe to judge the results of the two analyses to be highly reliable.

Figure 22:
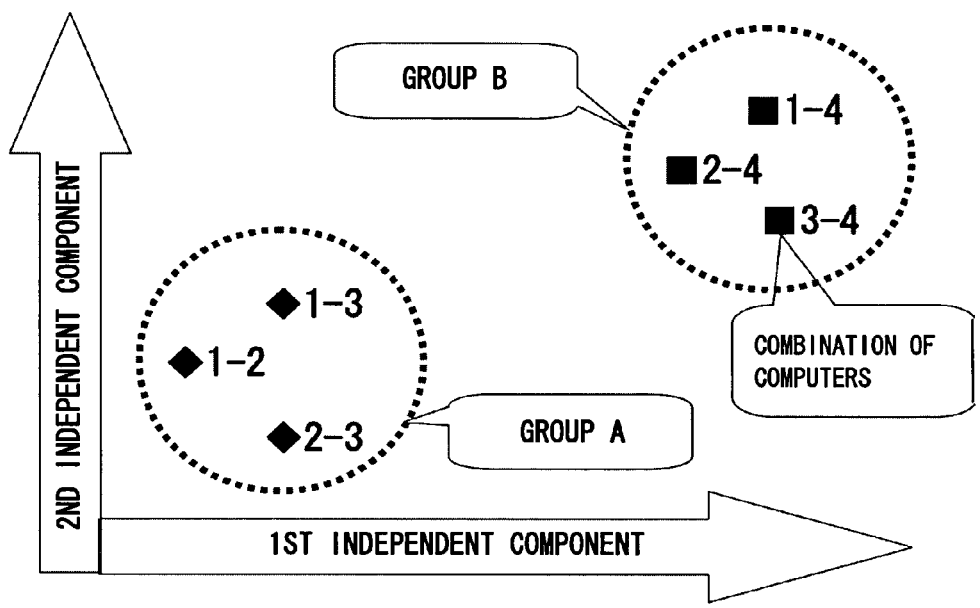
FIG. 22 is a schematic illustration of the display image of the results of analysis obtained by an independent component analysis.

FIG. 21 is a schematic illustration of independent component analysis computer data, shown as an example and FIG. 22 is a schematic illustration of the display image of the results of analysis by an independent component analysis computer. In FIG. 22, each coordinate axis indicates an independent component to be used for computations in the independent component analysis. Each spot in FIG. 22 indicates a combination of computers for communication. Computers showing the same tendency may be indicated by spots of the same profile and the same color as described above for Embodiment 4.

Embodiment 7

Embodiment 7 is adapted to execute a statistical analysis by way of a principal component analysis on the communication time combination data prepared by the above-described communication time combining step and display the similarity of a plurality of observation items. With this arrangement, it is possible for the user to easily grasp the overall tendency of relations of the observation items.

Figure 23:
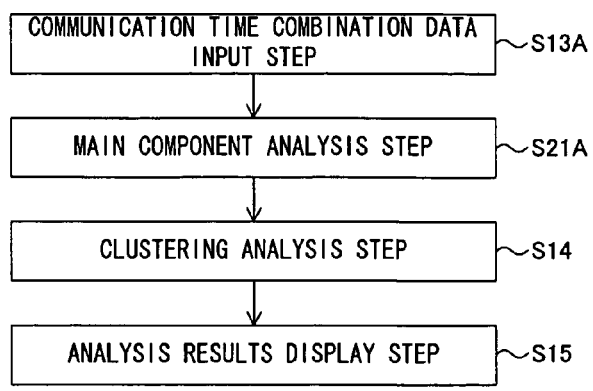
FIG. 23 is a flowchart of the operation of Embodiment 7 of the present invention.

FIG. 23 is a flowchart of the overall operation of Embodiment 7 of the present invention. Embodiment 7 is adapted to display the similarity of observation items obtained by the communication time combining step described above for Embodiment 5 and has a communication time combination data input step S13A, a principal component analysis step S21A that analyzes the similarity of observation items, a clustering analysis step S14 that groups computers in terms of the similarity of observation items on the basis of the results of the analysis and an analysis results display step S15 that displays the results of analysis.

The principal component analysis step S21A analyzes the similarly of observation items, using the communication time combination data and outputs principal component analysis observation item data (D3 in FIG. 14). The clustering analysis step S14 groups computers in terms of the similarity of observation items, using the principal component analysis observation item data and outputs the results of analysis for the principal component analysis observation items.

Figures 24, 25:
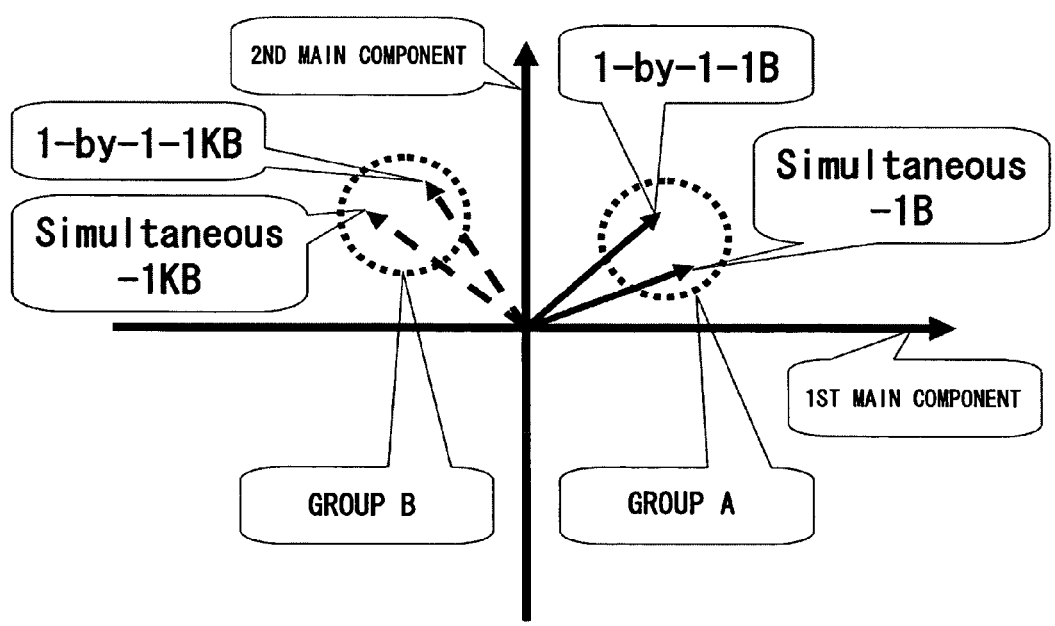
FIG. 24 is a schematic illustration of principal component analysis observation item data, shown as an example.
FIG. 25 is a schematic illustration of the display image of the results of analysis by principal component analysis relating to observation items.

FIG. 24 is a schematic illustration of principal component analysis observation item data, shown as an example. FIG. 25 is a schematic illustration of the display image in the analysis results display step that is the results of analysis for the principal component analysis observation items. In FIG. 25, the horizontal axis indicates the first principal component and the vertical axis indicates the second principal component. The arrows in FIG. 25 indicate observation items.

The observation items whose arrows indicate the same direction are interpreted to show similar results. The arrows of observation items showing similarity may be made to show the same profile and the same color to facilitate understanding of the display. In the illustrated example, observation items show a similar tendency when the communication data lengths are identical and the difference of mode does not have any significant influence.

Embodiment 8

Embodiment 8 is adapted to execute a statistical analysis by way of an independent component analysis on the communication time combination data prepared by the above-described communication time combining step and display the similarity of a plurality of observation items. With this arrangement, it is possible for the user to easily grasp the overall tendency of relations of the observation items.

Figures 26, 27:
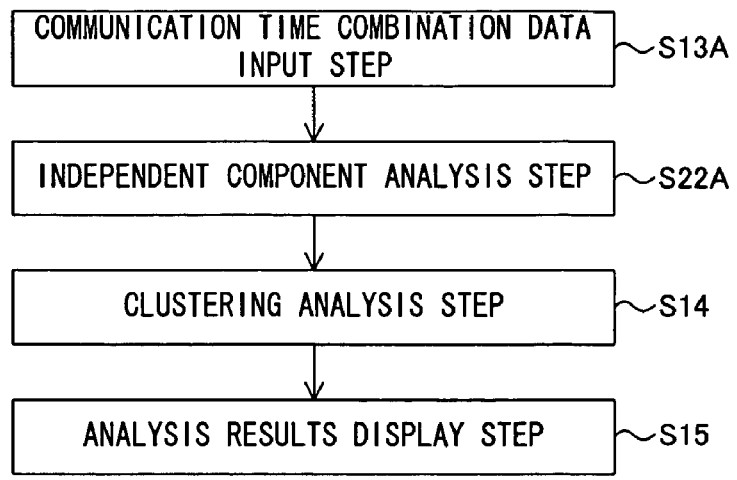
FIG. 26 is a flowchart of the operation of Embodiment 8 of the present invention.
FIG. 27 is a schematic illustration of independent component analysis observation item data, shown as an example.

FIG. 26 is a flowchart of the overall operation of Embodiment 8 of the present invention. Embodiment 8 is adapted to perform the similarity of observation items described above for Embodiment 6 by an independent component analysis and comprises an independent component analysis step S22A that replaces the principal component analysis step S21A of Embodiment 7.

The independent component analysis step S22A analyzes the similarly of observation items, using the communication time combination data and outputs independent component analysis observation item data (D4 in FIG. 19). The clustering analysis step S14 groups computers in terms of the similarity of observation items, using the independent component analysis observation item data and outputs the results of analysis for the independent component analysis observation items.

Figure 28:
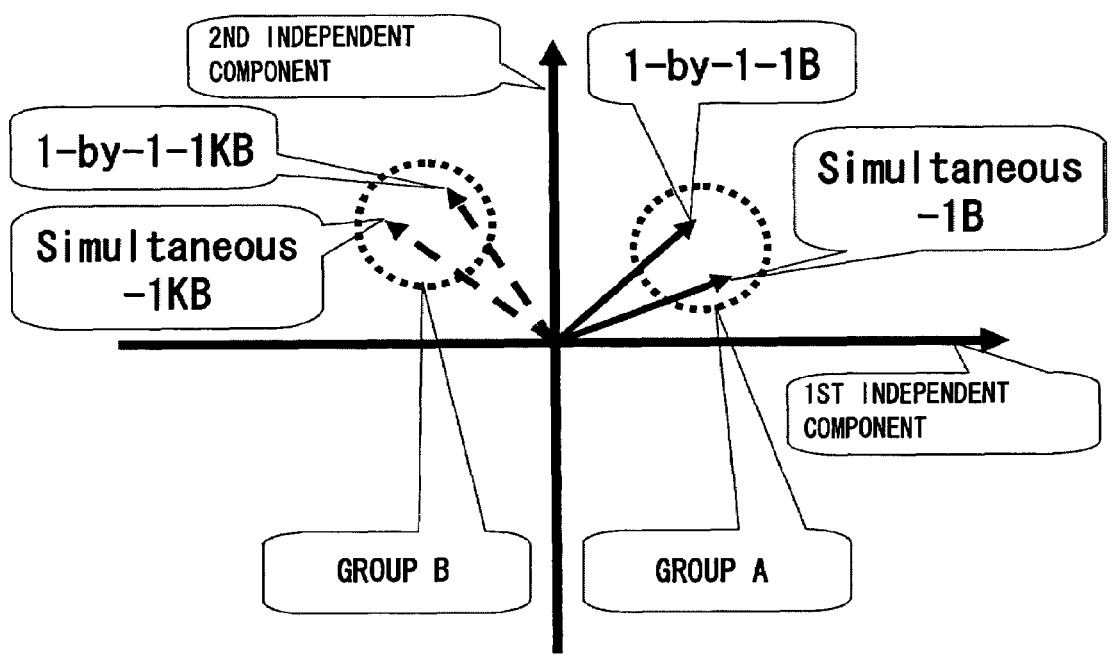
FIG. 28 is a schematic illustration of the display image of the results of analysis by independent component analysis relating to observation items.

FIG. 27 is a schematic illustration of independent component analysis observation item data, shown as an example. FIG. 28 is a schematic illustration of the display image in the analysis results display step that is the results of analysis for the independent component analysis observation items. In FIG. 28, the horizontal axis indicates the first independent component and the vertical axis indicates the second independent component. The arrows in FIG. 28 indicate observation items.

The observation items whose arrows indicate the same direction are interpreted to show similar results. The arrows of observation items showing similarity may be made to show the same profile and the same color to facilitate understanding of the display. In the illustrated example, observation items show a similar tendency when the communication data lengths are identical and the difference of mode does not have any significant influence.

Embodiment 9

Embodiment 9 is adapted to arrange computers showing communication relations on the vertical axis and the horizontal axis and display the results of the grouping realized on the basis of the similarity of communication times obtained by a clustering analysis so as to display the correspondence of the results of the grouping realized on the basis of the similarity of communication times and the computers so that the user may easily understand it.

Figure 29:
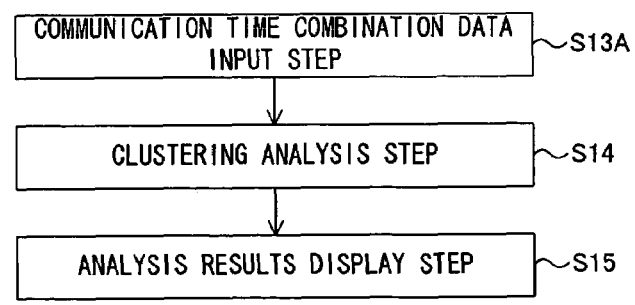
FIG. 29 is a flowchart of the operation of Embodiment 9 of the present invention.

FIG. 29 is a flowchart of the operation of Embodiment 9 of the present invention. Embodiment 9 will be described below for grouping the plurality of computers of the computer system from the viewpoint of similarity of communication times and displaying the communication performance.

Referring to FIG. 29, Embodiment 9 has a communication time combination data input step S13A, a clustering analysis step S14 that conducts a clustering analysis on the communication time combination data obtained by the input step S13A and an analysis results display step S15 that displays the results of the clustering analysis.

In the above-described arrangement, the clustering analysis step S14 may input the principal component analysis computer data described above by referring to Embodiment 7 or the independent component analysis computer data described above by referring to Embodiment 8 in place of the communication time combination data. Anyway, the clustering analysis step S14 groups the computers from the viewpoint of the similarity of communication times on the basis of the data and outputs computer group data.

The analysis results display step S15 corresponds to a group display section. It inputs the computer group data of the computers analyzed and grouped by the clustering analysis step S14, arranges computers on the horizontal axis and the vertical axis and outputs the group display results for displaying the computer groups by using different image profiles and different image colors.

FIG. 30 is a schematic illustration of the computer group data output by the clustering analysis step, shown as an example. FIG. 31 is a schematic illustration of an example of the group display results by the analysis results display step.

Of the displayed results shown in FIG. 31, a plurality of computers are arranged in an intermingled manner on each row and each column for computers 1 through 3. Same computers are arranged on the row and the column for computers 4. As a result, it is seen that the tendency of the communication performance data of the computers 4 differs from the tendency of the communication performance data of the combinations of other computers.

Embodiment 10

Embodiment 10 is adapted to display the relationship among observation items, communication times and computers in a manner that facilitates the understanding of the user by displaying the correspondence of inter-computer communication times, the groups relating to the observation items automatically classified by a principal component analysis or an independent component analysis and the groups relating to the communication times automatically classified by a clustering analysis.

Figure 32:
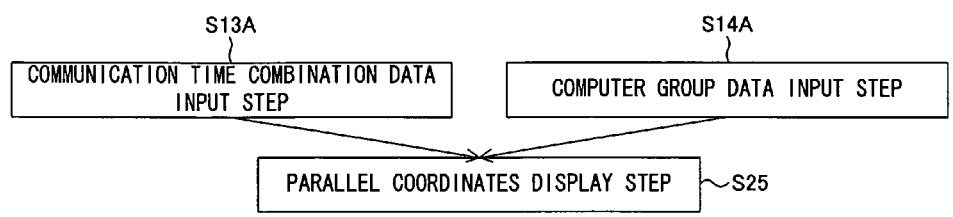
FIG. 32 is a flowchart of the operation of Embodiment 10 of the present invention.

FIG. 32 is a flowchart of the operation of Embodiment 10 of the present invention. Embodiment 10 will be described below in terms of grouping the plurality of computers of the computer system from the viewpoint of displaying communication performances by displaying the results of grouping for the similarity of communication times and the results of grouping for the similarity of observation items on parallel coordinates for the purpose of facilitating the understanding of the user.

This embodiment has a communication time combination data input step S13A, a computer group data input step S14A that inputs the computer group data obtained by the clustering analysis step S14 described above by referring to Embodiment 9 and a parallel coordinates display step S25 that displays parallel coordinates according to the data.

The parallel coordinates display step S25 is adapted to obtain the results of analysis for the principal component analysis observation items described above by referring to Embodiment 7 and the results of analysis for the independent component analysis observation items described above by referring to Embodiment 8 from the communication time combination data.

Figure 33:
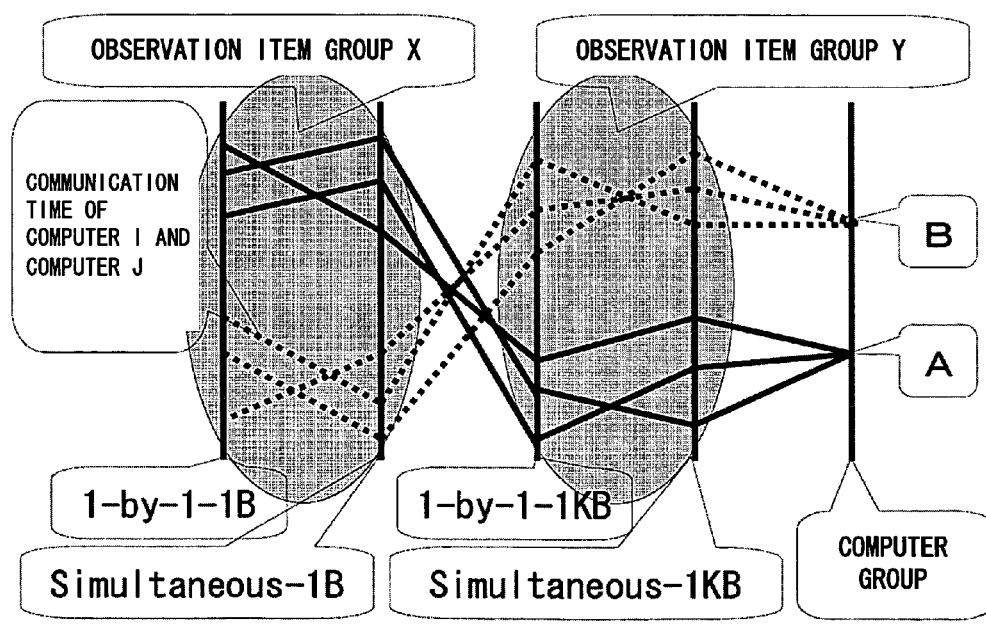
FIG. 33 is a schematic illustration of the display image of parallel coordinates, shown as an example.

FIG. 33 is a schematic illustration of the display image of parallel coordinates showing the computer group data illustrated in FIG. 30 by the parallel coordinates display step.

In FIG. 33, the axes indicate observation item groups and computer groups and the polygonal lines indicate the values obtained by normalizing the communication times and the values of the computer groups. It is possible to display the relations of the communication items, the communication times and the computer groups by using different image profiles and different image colors for the computer groups.

The parallel coordinates display step S25 displays the relations of the groups of observation items, the communication times and the computer groups for each group of observation items by using different image profiles and image colors for the axes of observation items.

In the instance of FIG. 33, the computer group A shows long communication times for the observation item group X and short communication times for the observation item group Y On the other hand, the computer group B shows short communication times for the observation item group X and long communication times for the observation item group Y While the parallel coordinates display step of this embodiment can obtain the results of analysis for the principal component analysis observation items described above by referring to Embodiment 7 and the results of analysis for the independent component analysis observation items described above by referring to Embodiment 8 from the communication time combination data in the above description, it may alternatively be so arranged as to be able to obtain those results directly from the component analysis steps of the embodiments.

Embodiment 11

Embodiment 11 is adapted to conduct a scoring analysis of computing scores for the degree of normality and that of abnormality of the communication performance of each computer on the basis of the results of grouping obtained by the above-described clustering analysis and display information on the priority to be used when the user looks into a computer trouble.

Figures 34, 35, 36:
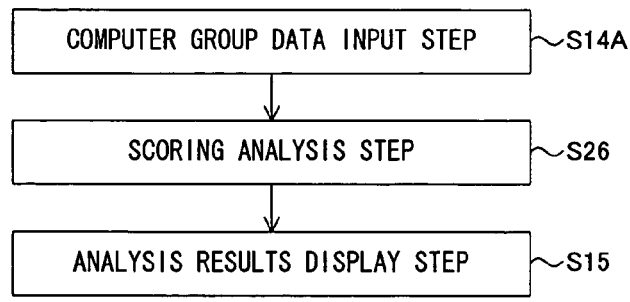
FIG. 34 is a flowchart of the operation of Embodiment 11 of the present invention.
FIG. 35 is a schematic illustration of computer group data, also shown as an example.
FIG. 36 is a schematic illustration of the display image of the results of scoring analysis.

FIG. 34 is a flowchart of the operation of Embodiment 11 of the present invention. Embodiment 11 will be described below in terms of displaying scores for the degree of normality and that of abnormality of the communication performance of each computer.

This embodiment comprises a computer group data input step S14A, a scoring analysis step S26 and an analysis results display step S15.

The scoring analysis step S26 inputs the computer group data, computes scores for the degree of normality and that of abnormality of the communication performance of each computer and outputs them as the results of a scoring analysis. A technique of computing scores will be described below.

Firstly, as computer group data as shown in FIG. 35 are obtained, the scoring analysis step S26 uses 1/(total number of combinations of the computers in question) as partial score for each computer group. Assume here that the following partial scores are obtained.

1) partial score of computer group A=¼
2) partial score of computer group B=½

Then, the scoring analysis step S26 computes the scores of the computers as the total of the partial scores for the communications of the target computer and all the other computers. Assume here that the following scores are obtained by computations.

1) score of computer 1=¾
2) score of computer 2=1
3) score of computer 3=1
4) score of computer 4=5/4

In this way, evaluation indexes are computed to indicate that the degree of abnormality is high when the score of a computer is large whereas the degree of abnormality is low when the score of a computer is small.

FIG. 36 is a schematic illustration of the display image of the results of scoring analysis, shown as an example.

Thus, the user can find out that the computer trouble can be looked into efficiently when the investigation is started from the computer 4 that shows a high probability of computer trouble.

Embodiment 12

Embodiment 12 is adapted to illustrate the relationship of the observation items and the results of grouping obtained by the clustering analysis step by means of a tree structure.

Figure 37:
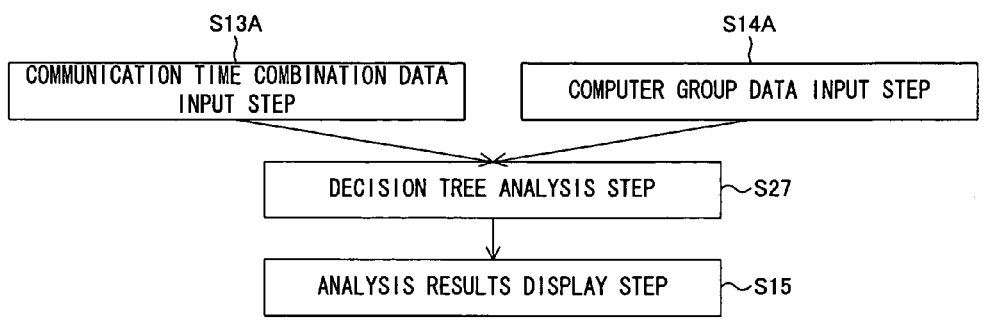
FIG. 37 is a flowchart of the operation of Embodiment 12 of the present invention.

FIG. 37 is a flowchart of the operation of Embodiment 12 of the present invention. This embodiment comprises a communication time combination data input step S13A, a computer group data input step S14A, a decision tree analysis step S27 that analyzes a decision tree by using communication time combination data and computer group data and an analysis results display step S15 that displays the results of the analysis.

The decision tree analysis by the decision tree analysis step S27 is based on the well known decision tree algorithm, which hence will not be described here any further.

A decision tree is used to tentatively divide all the observation items of communication time combination data by means of all the threshold values and recursively repeat the process of selecting the division that explains the results of grouping the computer group data best for conditional branching. For instance, it is a good division if the data of a particular group are applicable when the answer to a division of an observation item by means of a threshold value is Yes and if the data of some other group are applicable when the answer is No.

For instance, it is a bad division if the data of a plurality of groups coexist when the answer to a division of an observation item by means of a threshold value is Yes and if the data of a plurality of groups also coexist when the answer is No. A decision tree explains a data tendency by means of a tree structure and hence provides a merit of allowing the user to realize important observation items with ease. While communication time combination data and computer group data are input in the above description, this embodiment can also be applied to a situation where communication time combination data and computer trouble investigation results data are input.

As pointed out above, this embodiment is applicable to a situation where computer trouble investigation results data obtained by actually investigating computers for a computer trouble are input in place of computer group data.

Figure 38:
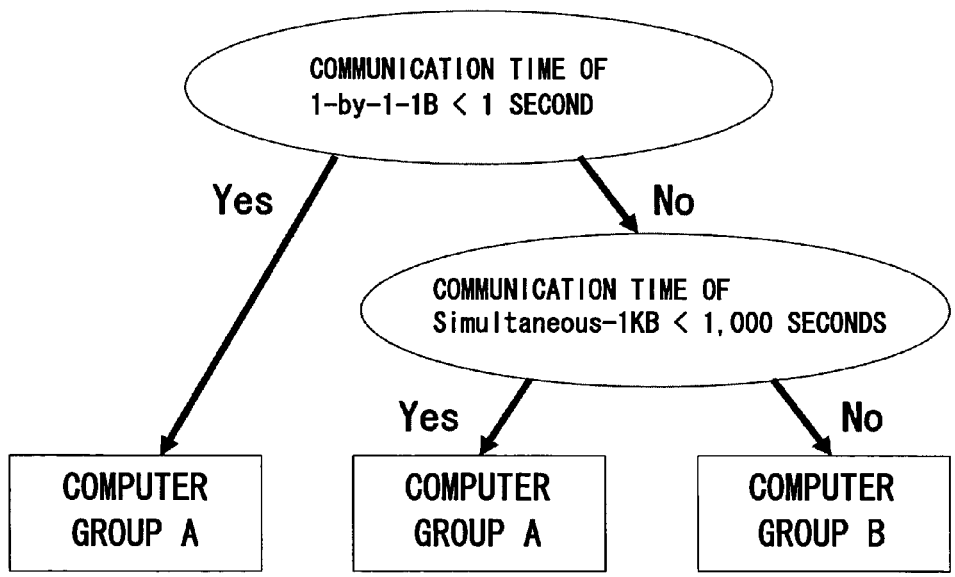
FIG. 38 is a schematic illustration of the display image of the results of decision tree analysis.

FIG. 38 is a schematic illustration of the display image of the results of decision tree analysis. In FIG. 38, each ellipse represents a conditional branching based on the observed values of communication times and each terminal rectangular represents a computer group. This embodiment can display the relationship between observed values of communication times and computer groups to allow the user to understand with ease, using the range of observed values of communication times as condition part and the computer groups as conclusion part.

Embodiment 13

Embodiment 13 has observation items and a clustering analysis step and is adapted to display the relationship of the observation items and the results of a clustering analysis to allow the user to understand with ease.

FIG. 39 is a flowchart of the operation of Embodiment 13 of the present invention. Embodiment 13 is adapted to display the relationship between observed values of communication times and the computer groups, using the range of observed values of communication times as conditional part and the computer groups as conclusion part.

This embodiment comprises a communication time combination data input step S13A, a computer group data input step S14A, a rule analysis step S28 that analyzes rules by using communication time combination data and computer group data and an analysis results display step S15 that displays the results of the analysis.

The rule analysis by the rule analysis step is based on the well known rule algorithm and hence will not be described here any further.

Rules are basically prepared by reading each conditional branching of a decision tree as a rule. Sophisticated techniques to prepare the rules include (1) abridging the condition part of a rule so far as such an abridgement does not damage the accuracy of the rule as a whole, (2) replacing the order of rules to raise the accuracy thereof and (3) assigning the results of a specific grouping to the data to which no rule is applicable.

Rules provide a merit of allowing the user to interpret the relationship between the observed communication times and the results of grouping with ease because they explain the relationship most explicitly. While communication time combination data and computer group data are input in the above description, this embodiment can also be applied to a situation where communication time combination data and computer trouble investigation results data are input.

As pointed out above, this embodiment is applicable to a situation where computer trouble investigation results data obtained by actually investigating computers for a computer trouble are input in place of computer group data.

FIG. 40 is a schematic illustration of the display image of the result of rule analysis. This embodiment can display the relationship between observed values of communication times and computer groups to allow the user to understand with ease, using the range of observed values of communication times as condition part and the computer groups as conclusion part.

Embodiment 14

Embodiment 14 is adapted to display the relationship between the communication performance and the computer trouble to allow the user to understand with ease by accumulating the communication time data observed by the communication time observation step and the data relating to the results of the investigation actually conducted on computers and analyzing the correspondence between an actual computer trouble and a situation where a given condition is applicable to the communication time.

FIG. 41 is a flowchart of the operation of Embodiment 14 of the present invention. Embodiment 14 analyzes and displays the relationship between the measured values of communication times and the computer trouble.

Embodiment 14 comprises a communication time combination data input step S13A, a computer trouble investigation results data input step S31 that inputs the computer trouble investigation results data that is the results of the actual investigation of the trouble of the computer, a trouble analysis step S32 that analyzes the computer trouble on the basis of a decision tree and the rule algorithm, using the communication time combination data and the computer trouble investigation results data as input, and also the relationship between the measured values of communication times and the computer trouble as trouble analysis and an analysis results display step S33 that displays the results of the analysis.

Figures 42, 43, 44:
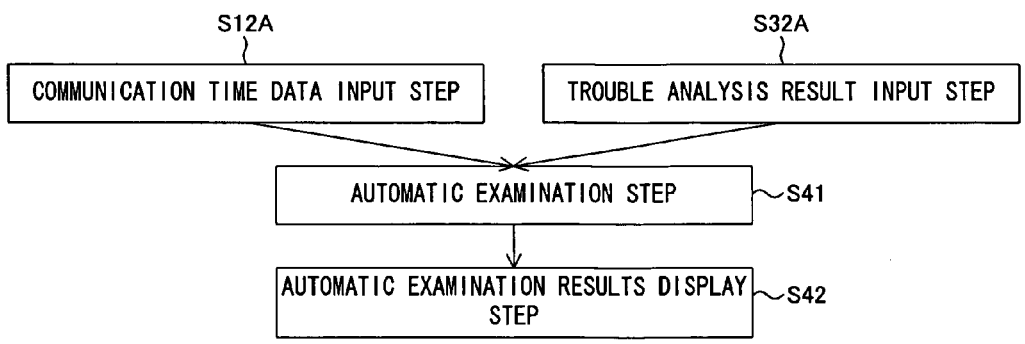
FIG. 42 is a schematic illustration of computer trouble investigation result data, shown as an example.
FIG. 43 is a schematic illustration of trouble analysis results, shown as an example.
FIG. 44 is a flowchart of the operation of Embodiment 15 of the present invention.

FIG. 42 is a schematic illustration of computer trouble investigation result data, shown as an example. FIG. 43 is a schematic illustration of trouble analysis results, also shown as an example. The condition part of each of the rules shown in FIG. 43 indicates the range of measured values of communication times and the conclusion part of each of the rules indicates the judgment of normal or trouble.

While the trouble analysis step of this embodiment analyzes the trouble on the basis of the rule algorithm in the above description, it may alternatively use a decision tree for the analysis.

Embodiment 15

Embodiment 15 is adapted to automatically observe communication times by the communication time observation step, automatically examine the probability of a fall of communication performance and a computer trouble on the basis of the trouble analysis results and displays the results to the user so that the user can obtain information on the probability of a fall of communication performance and a computer trouble while the computer system is operating.

FIG. 44 is a flowchart of the operation of Embodiment 15 of the present invention. Embodiment 15 inputs communication time data and trouble analysis results and automatically conducts an examination.

This embodiment comprises a communication time combination data input step S12A, a trouble analysis results input step S32A that inputs the results of trouble analysis as described above for Embodiment 14, an automatic examination step S41 that inputs the communication time data and the results of trouble analysis and outputs the results of automatic examination and an examination results display step S42 that displays the results of automatic examination.

The results of automatic examination are output as "a high probability of trouble" when a trouble may have occurred according to the decision tree and the rules obtained as a result of the trouble analysis step S32 described above for Embodiment 14 but as "a low probability of trouble" when no trouble may have occurred.

The communication time is observed automatically while the computer system is in operation in a time zone where no job is found or after the end of a job and before the start of the next job so long as the proper operation of the system is not significantly affected.

For example, a PC cluster to which any of the above-described embodiments is applicable is formed by connecting a management computer and a plurality of slave computers that execute computer simulation processes by way of a network. The above-described embodiments operate on such a management computer to cause the slave computers to execute a communication time observation program, collect communication times, analyze the communication times by means of any of various statistical analysis techniques and presents the obtained results to the user.

With any of the above-described embodiments, it is possible to have a computer to use a communication performance analyzing method by storing the steps of the applicable flowchart in a computer readable recording medium as communication performance analyzing program. Computer readable recording mediums that can be used for the purpose of the present invention include portable type storage mediums such as CD-ROMs, flexible disks, DVD disks, magneto-optical disks and IC cards, databases storing computer programs, other computers and databases thereof and transmission mediums on communication lines.

The above-described embodiments of the present invention provide the following advantages.

1) A computer in trouble can be detected with ease by observing the communication times of a plurality of computers connected by way of a network, assuming the communication time of any two computers to be the distance between them when placing the computers by seeing the tendency of data on communication times, displaying the obtained results with the computer that can be in trouble isolated from the other computers.
2) A computer that can be in trouble can be presented to the user so that the user may realize it with ease by grouping similar combinations of computers showing a communicating relationship on the basis of the tendency of data on communication times.
3) The correlations of observation items can be presented to the user so that the user may realize them with ease by grouping similar observation items on the basis of the tendency of data on communication times.
4) The correlations of observation items and combinations of computers showing a communicating relationship can be presented to the user so that the user may realize them with ease by displaying the results of grouping the observation items and the combinations of computers showing a communicating relationship in juxtaposition.
5) The tendency of data on communication times of each computer can be presented to the user so that the user may realize it with ease for the data on communication times observed for combinations of computers.
6) The operation of deciding the priority of computers can be supported when the user examine the trouble of a computer by computing the scores of the computers in terms of the degree of normality or abnormality from the viewpoint of communication performance.
7) The conditions relating to the measured values of communication times that characterize grouping of combinations of computers showing a communicating relationship can be presented to the user so that the user may realize them with ease by analyzing them by means of a decision tree and/or the rule algorithm.
8) The conditions of the measured value of communication times applicable to a computer in trouble can be presented to the user so that the user may realize them with ease by accumulating data on communication times and on the results of the actual investigation of the trouble of the computer.
9) A fall in the communication performance and the probability of a computer trouble can be detected early by automatically observing communication times and issuing an alarm to the user when a computer to which the conditions of communication time indicating a fall in the communication performance and the probability of a computer trouble are applicable.

What is claimed is:

1. A computer storage tangibly storing a communication performance analyzing program containing instructions for causing a computer to execute an operation including analyzing a communication performance among computers of a computer system formed by connecting a plurality of computers by a network, comprising:

acquiring communication time data among the computers of the computer system on a plurality of observation items;

executing a communication time combining operation that permutes the communication time data on the plurality of observation items to make communication time combination data;

executing a clustering analysis operation that conducts a statistical analysis by clustering the communication time combination data to group the communication time combination data as to combinations of computers or the observation items;

displaying the analyzed result;

executing a principal component analysis that conducts a statistical analysis on the communication time data by way of principal component analysis, using the communication time combination data prepared by the communication time combining, the clustering analysis groups the results of the statistical analysis conducted by the principal component analysis and displays a scatter diagram based on predetermined principal components, wherein the principal component analysis conducts an analysis on the similarity of the plurality of observation items, using the communication time combination data prepared by the communication time combining, and generates principal component analysis/observation item data; and the clustering analysis conducts a grouping operation for the similarity of the observation items, using the principal component analysis/observation item data generated by the principal component analysis.

2. The computer storage medium according to claim 1, wherein
the statistical analysis includes conducting an analysis, using metrical multidimensional scaling.

3. The computer storage medium according to claim 1, wherein
the statistical analysis includes conducting an analysis, using non-metrical multidimensional scaling.

4. The computer storage medium according to claim 1, wherein
the statistical analysis includes an analysis, using a sammon mapping algorithm.

5. The computer storage medium according to claim 1, further comprising:
executing an independent component analysis that conducts a statistical analysis by way of independent component analysis, using the communication time combination data prepared by the communication time combining, and
the clustering analysis groups the results of the statistical analysis conducted by the independent component analysis and displays a scatter diagram based on predetermined independent components.

6. The computer storage medium according to claim 5, wherein
the independent component analysis conducts an analysis on the similarity of the plurality of observation items, using the communication time combination data prepared by the communication time combining, and generates independent component analysis/observation item data, and
the clustering analysis conducts a grouping operation for the similarity of the observation items, using the independent component analysis/observation item data generated by the independent component analysis.

7. The computer storage medium according to claim 1, wherein
the clustering analysis includes providing a group display that groups the plurality of computers on the basis of the similarity of communication time,
sets each of the computers on the vertical axis and the horizontal axis for each group of computers formed on the similarity of communication time obtained by the clustering analysis and displays the results of the grouping conducted by the clustering analysis.

8. The computer storage medium according to claim 1, further comprising:
executing a computer grouping that groups the plurality of computers according to the communication time combination data acquired by the communication time combining;
performing an observation item grouping that groups the plurality of observation items according to the communication time combining data acquired by the communication time combining; and
displaying the computer groups obtained by the computer grouping in association with the observation item groups obtained by the observation item grouping.

9. The computer storage medium according to claim 1, further comprising:
conducting a scoring analysis that computes scores on the degree of normality or abnormality of the communication performance of each computer on the basis of the results of grouping the computers by the clustering analysis.

10. The computer storage medium according to claim 8, wherein
the displaying includes a parallel coordinate plot of displaying the communication times between two computers on a plurality of polygonal lines by indicating the observation items on each of a plurality of axes and indicating computer groups on an axis.

11. The computer storage medium according to claim 1, wherein
the clustering analysis includes a decision tree analysis that indicates the relationship between the plurality of observation item groups and the plurality of computer groups by using an algorithm of a decision tree and displays the computer groups as conclusion part on the condition of the range of each of the item groups.

12. A communication performance analyzing apparatus that analyzes a data tendency of communication performance of a plurality of execution periods of a computer system formed by connecting a plurality of computers by a network, the apparatus comprising:
a storage device storing a program which when executed by a processor, performs steps comprising:
acquiring communication time data among the computers of the computer system on a plurality of observation items;
executing a communication time combining operation that permutes the communication time data on the plurality of observation items to make communication time combination data;
executing a clustering analysis operation that conducts a statistical analysis by clustering the communication time combination data to group the communication time combination data as to combinations of computers or the observation items;
displaying the analyzed result;
executing a principal component analysis that conducts a statistical analysis on the communication time data by way of principal component analysis, using the communication time combination data prepared by the communication time combining,
the clustering analysis groups the results of the statistical analysis conducted by the principal component analysis and displays a scatter diagram based on predetermined principal components, wherein the principal component analysis conducts an analysis on the similarity of the plurality of observation items, using the communication time combination data prepared by the communication time combining, and
generates principal component analysis/observation item data; and the clustering analysis conducts a grouping operation for the similarity of the observation items, using the principal component analysis/observation item data generated by the principal component analysis.

13. The apparatus according to claim 12, further comprising:
an independent component analysis section that conducts a statistical analysis by way of independent component analysis, using the communication time combination data prepared by the communication time combining section; and the clustering analysis section groups the results of the statistical analysis conducted by the independent component analysis section and displays a scatter diagram based on predetermined independent components.

14. A computer-implemented communication performance analyzing method that causes a computer to execute an operation including analyzing a data tendency of communication performance of a plurality of execution periods of a computer system formed by connecting a plurality of computers by a network, comprising:

acquiring communication time data among the computers of the computer system on a plurality of observation items;

executing a communication time combining operation that permutes the communication time data on the plurality of observation items to make communication time combination data;

executing a clustering analysis operation that conducts a statistical analysis by clustering the communication time combination data to group the communication time combination data as to combinations of computers or the observation items;

displaying the analyzed result;

executing a principal component analysis that conducts a statistical analysis on the communication time data by way of principal component analysis, using the communication time combination data prepared by the communication time combining, the clustering analysis groups the results of the statistical analysis conducted by the principal component analysis and displays a scatter diagram based on predetermined principal components, wherein the principal component analysis conducts an analysis on the similarity of the plurality of observation items, using the communication time combination data reared by the communication time combining, and generates principal component analysis/observation item data; and the clustering analysis conducts a grouping operation for the similarity of the observation items, using the principal component analysis/observation item data generated by the principal component analysis.

* * * * *

UNITED STATES PATENT AND TRADEMARK OFFICE
CERTIFICATE OF CORRECTION

| | | |
|---|---|---|
| PATENT NO. | : 7,660,885 B2 | Page 1 of 1 |
| APPLICATION NO. | : 11/648660 | |
| DATED | : February 9, 2010 | |
| INVENTOR(S) | : Kazuhiro Matsumoto et al. | |

It is certified that error appears in the above-identified patent and that said Letters Patent is hereby corrected as shown below:

Column 24, Line 16, change "reared" to --prepared--.

Signed and Sealed this

Eleventh Day of May, 2010

David J. Kappos
*Director of the United States Patent and Trademark Office*